BENJAMIN G. FITZHUGH.
Improvement in Broilers.
No. 119,974. Patented Oct. 17, 1871.
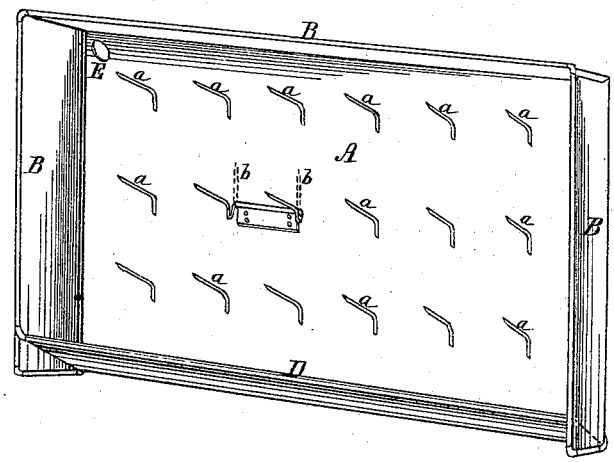
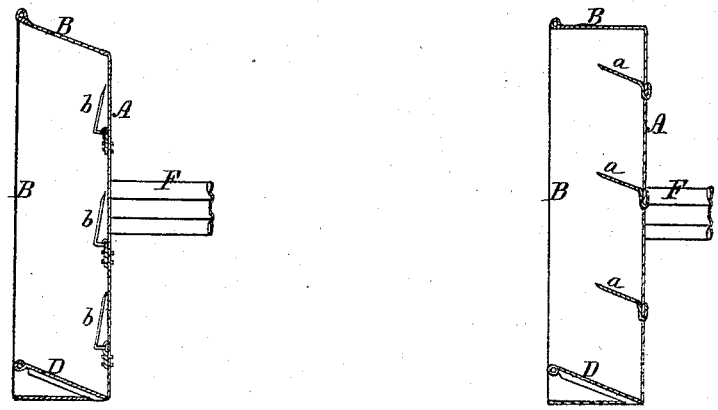
Witnesses:
W. R. Edelen.
Parker H. Sweet, Jr.
Inventor:
Benjamin G. Fitzhugh,
by Johnson, Klaucke &co
his attorneys

UNITED STATES PATENT OFFICE.

BENJAMIN G. FITZHUGH, OF FREDERICK, MARYLAND.

IMPROVEMENT IN BROILERS.

Specification forming part of Letters Patent No. 119,974, dated October 17, 1871.

*To all whom it may concern:*

Be it known that I, BENJAMIN G. FITZHUGH, of the city and county of Frederick, in the State of Maryland, have invented a new and useful Improvement in Toasters, Roasters, and Broilers, of which the following is a specification:

The object of my invention is to produce a simple, cheap, and effective cooking utensil for roasting and broiling meats, and for toasting bread, tomatoes, &c.; and it consists of a rectangular shield, with projecting spits, and having its edges bent to form rims, one of said rims being produced to form a dripping-trough, the complete utensil presenting the appearance of a shallow open box with its bottom studded with spits. The accompanying drawing represents a view in perspective and sections fully illustrating my improvement.

This device may be constructed of tin, sheet-iron, or of cast-iron. The shield A has its sides bent at right angles, or inclined to form rims B, which serve to retain and refract the heat. From the face of this shield A spits a, arranged at proper intervals, extend slightly upward for the purpose of holding articles spitted thereon. They also serve, in toasting bread, to present the surfaces of the slices at the proper angle to the fire; and they may be bent and hinged to the shield in pairs, so as to be folded up against its side, as shown in the drawing at b. In the position shown in the drawing, the bottom rim is produced and inclined upward, to form a trough or dripping-pan, D, which receives the drippings of the meats. At one of the upper corners of this toasting-shield an outlet, E, may be made for the purpose of emptying the contents of the dripping-pan. It will be readily understood from this description that the articles of food to be toasted, roasted, or broiled are fastened to the spits $a$, and the implement is placed before the fire, resting upon one of the rims B, which serves as a base, or the vertical sides thereof. When the dripping-pan or trough D is filled the cook tilts the shield by means of a suitable handle, F, and pours out the contents. It is obvious that almost any article of food can be roasted, toasted, or broiled in the best manner by means of this simple and effective cooking utensil.

The advantages of my invention in toasting bread, broiling steaks, roasting meats and vegetables, and preserving the drippings are manifest. One important advantage is gained by my improvement in having heat-retaining and refracting sides, serving also, in some degree, to confine the aroma of the food. In addition to its cleanliness, it is exceedingly useful, and a great relief to those who are compelled to stoop before scorching fire and laboriously toast bread, &c., upon a fork. C represents a rod with spits, and a series of these rods may be arranged upon the shield.

Having described my invention, I claim—

The roasting, toasting, and broiling-utensil, consisting of the back A, rims B, dripping-trough D, handle F, and spits $a\ b$, substantially as described.

The above specification of my improvement in combined toaster and broiler signed this 3d day of August 1871.

B. G. FITZHUGH.

Witnesses:
 A. E. H. JOHNSON,
 ALEXR. A. C. KLAUCKE. (154)